United States Patent [19]

Kurtzberg

[11] 3,924,270

[45] Dec. 2, 1975

[54] RECURSIVE SHIFT REGISTER FOR CONTROLLING A DATA PROCESSOR

[75] Inventor: Jerome Marvin Kurtzberg, Yorktown Heights, N.Y.

[73] Assignee: International Business Machines Corporation, Armonk, N.Y.

[22] Filed: May 6, 1974

[21] Appl. No.: 467,039

[52] U.S. Cl. .......... 340/172.5

[51] Int. Cl.$^2$ .......... G06F 13/02

[58] Field of Search .......... 340/172.5; 445/1

[56] References Cited

UNITED STATES PATENTS

| | | | |
|---|---|---|---|
| 3,001,708 | 9/1961 | Glzser et al. | 340/172.5 |
| 3,061,192 | 10/1962 | Ferzzin | 340/172.5 |
| 3,222,648 | 12/1965 | Bell | 340/172.5 |

*Primary Examiner*—Vincent P. Canney

*Attorney, Agent, or Firm*—Roy R. Schlemmer; Victor Siber

[57] ABSTRACT

This is a data processor having two modes of operation. In a first mode of operation, computer instructions are fetched from storage and placed in an instruction register for controlling the internal logical operations executed within the processor. In a second mode of operation, a recursive shift register is utilized for the purpose of sequencing through a series of computer instructions. The recursive shift register may be preloaded with any starting value to select a desired sequence position. Sequencing of the recursive shift register provides for execution of a program or subprogram without the need to access stored program instructions from a storage device.

8 Claims, 8 Drawing Figures

RECURSIVE SHIFT REGISTER FOR CONTROLLING A DATA PROCESSOR

BACKGROUND OF THE INVENTION

1. Field of the Invention

This invention relates to the field of digital data processors, more particularly, to the mechanisms and processes for providing program computer instructions to control a data processor.

2. Brief Description of the Prior Art

In a conventional digital data processor, a stored program is maintained in memory means and is available for access during the execution of the program. During the execution phase, the sequence of computer instructions to be accessed are specified by a pointer or register which always points to the next instruction. Each of these identified instructions which are available in storage are accessed and placed in an instruction register sequentially. The binary pattern that exists in the instruction register is then decoded by means of an instruction decoder for providing a plurality of signal levels to control the logical operations of the data processor in effecting the function of the specific instruction represented by the binary pattern contained in the instruction register. Since each computer instruction must be accessed from a data storage device, a significant amount of time is expended in merely providing the instruction to the instruction register. One way of limiting this expenditure of processing time is to provide additional registers which can be preloaded with the next instruction prior to execution. While this technique provides for a saving of processing time, it does necessitate an additional expenditure of circuitry and complexity in the organization of the data processor.

Another approach which has been taken in the prior art to reduce the amount of processing time required in fetching instructions from computer memory is to subdivide the memory into a plurality of sections. Then, by alternating the instructions so that they successively address different portions of the memory, it is possible to provide for an access of the next instruction during the execution of a present instruction. Similar to the addition of registers as discussed above, this technique also increases the cost of the data processor.

OBJECTS OF THE INVENTION

Therefore, it is an object of the present invention to reduce the amount of time required for providing computer instructions to an instruction decoder within a data processor.

It is a further object of the present invention to effect a stored program without the need of accessing each computer instruction in the program.

It is a further object of the present invention to eliminate the need for storing a complete program within storage means by providing a recursive register that can cycle through a predetermined set of binary patterns each of which effect a set of desired functions within a data processor.

SUMMARY OF THE INVENTION

In the present invention a system is provided for generating a set of instructions that can be carried out by a data processor. The disclosed exemplary embodiment operates in two distinct modes. In the first mode of operation, which is the conventional mode, the data processor utilizes the conventional instruction register for providing computer instructions to a decoder. Instructions are accessed from data store means, sequentially, in accordance with the current value in an instruction pointer or program counter register. These instructions are accessed and placed in the instruction register for decoding and controlling the operations of the data processor.

Upon detection of a specific instruction requesting entry into the second mode of operation, a recursive shift register is utilized for generating a sequence of binary patterns, each of which is a separate and distinct computer instruction. The recursive shift register may be either set to its starting sequence value condition or initialized with a specific binary pattern to begin the recursive pattern at any specific part of the sequence. The binary patterns retained in the recursive shift register are decoded by an instruction decoder whose output lines control the operation of the data processor. Exit from the second mode of operation can be effected by recognition of a specific instruction pattern contained within the recursive shift register and decoded by the instruction decoder.

Many different computer programs can be realized by rearrangement of the various feedback paths within the recursive shift register.

DETAILED DESCRIPTION OF THE INVENTION

General Theory

In a typical general purpose data processor the computer instruction fetch operation is alternated with the computer instruction execution operation. An instruction counter is used which contains the address of the current computer instruction, and this counter is either incremented or has its contents altered as the result of the execution operation. The incrementing of the instruction counter or the replacing of its contents is usually done sometime during the execution operation.

Described herein is a digital data processor which, in addition to the usual instruction counter, provides a recursive (linear feedback) shift register, the binary states of which are used as the operations codes of a program. This recursive shift register is shifted during an execution operation thus effectively eliminating the instruction fetch time and the need to store the instructions in memory.

It should be noted that computer instructions are generally stored in the memory of the general purpose computer and they contain, in addition to the operation code, certain fields which posess data or references to data. These fields may be addresses of operands, constants, etc., which are necessary for the execution of the instruction. In order to take full advantage of the recursive shift register structure provided herein, it is assumed that all operands, etc., needed for the program which is to be executed and represented by the successive states of the shift register are stored in working registers or in specified locations in memory.

Included within the instruction set for the general purpose computer are special instructions which are used to activate the recursive shift register mechanism. This recursive shift register may be activated to execute either a subroutine or program and then return control to the main line program wich was running prior to activation.

The general purpose computer thus can operate in one of two modes. In one mode of operation the computer employs the usual instruction fetch from memory followed by an execution of the fetched instruction. In the alternate mode of operation the computer operates under control of the recursive shift register which is cycled during each execution of an instruction.

Figure 1:
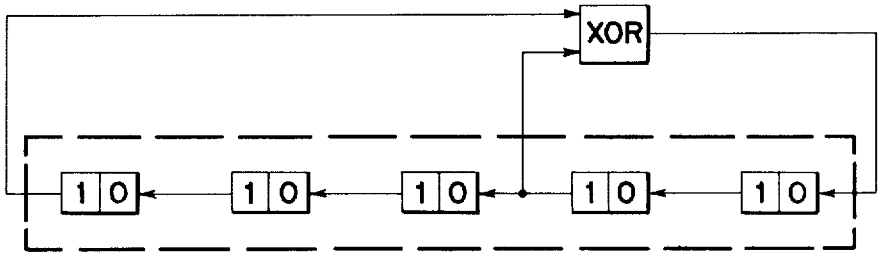
FIG. 1 is a schematic representation of a 5-bit recursive shift register having a cycle of 31 different states.

Referring to FIG. 1, there is shown a schematic representation of a particular 5-bit recursive shift register. The five stage shift register shown with the specific feedback to the fourth cell in the register permits the cycling of all possible binary conditions which are capable of being contained within a 5-bit binary number except for the value of 00000. Table 1 shows all of the 31 possible states through which the register will cycle. Note, that the recursive shift register will not cycle out of an all zero condition.

TABLE 1

| sequence number | register contents | sequence number | register contents | sequence number | register contents |
|---|---|---|---|---|---|
| 1 | 00001 | 2 | 00010 | 3 | 00101 |
| 4 | 01010 | 5 | 10101 | 6 | 01011 |
| 7 | 10111 | 8 | 01110 | 9 | 11101 |
| 10 | 11011 | 11 | 10110 | 12 | 01100 |
| 13 | 11000 | 14 | 10001 | 15 | 00011 |
| 16 | 00111 | 17 | 01111 | 18 | 11111 |
| 19 | 11110 | 20 | 11100 | 21 | 11001 |
| 22 | 10011 | 23 | 00110 | 24 | 01101 |
| 25 | 11010 | 26 | 10100 | 27 | 01001 |
| 25 | 11010 | 26 | 10100 | 27 | 01001 |
| 28 | 10010 | 29 | 00100 | 30 | 01000 |
| 31 | 10000 | | | | |

As mentioned previously, each one of the 31 states shown in Table 1 may be regarded as a computer instruction operation code which can specify any type of execution desired. The five bit shift register just described could provide a program sequence of 31 distinct steps or instructions which could be a loop or be repeated as many times as desired until the shift register is set to a value of 00000. The same shift register of FIG. 1 could be utilized to provide several sequences of fewer than 31 steps. For example, states No. 1 through No. 7 could constitute a loop. State No. 8 could specify a conditional branch which would either repeat states No. 1 through No. 7 or continue on to State No. 9. That is, the execution of State No. 8 would reset the shift register to 00001 if the loop is to be repeated or allow the shift register to continue to 11101, which is State No. 9. It should be understood that branching to any state of the shift register can be accomplished by resetting the shift register to the value which specifies the desired state. A particular state of the shift register could represent a "task completion" test which, if successful, would return the control of the data processor or computer to its stored program. This could be accomplished directly by changing the "mode" control and incrementing the Instruction Counter or indirectly by resetting the shift register to 00000 and using this code to accomplish the desired result. It will be noted that when the recursive shift register is reset to 00000, it cannot leave this state until it is reset to some other 5-bit binary number.

Figure 2:
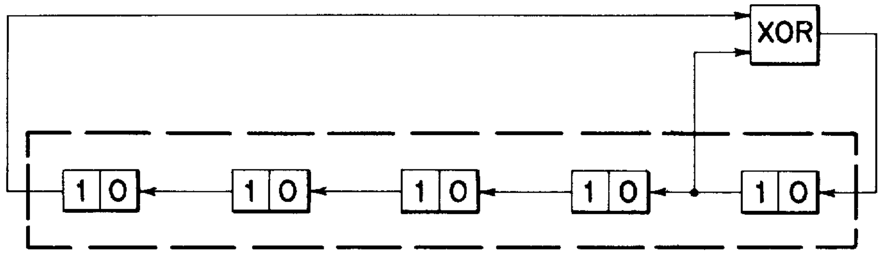
FIG. 2 is a schematic representation of a 5-bit recursive shift register having three different cycles yielding 3, 7 and 21 different states.

Another form of a recursive shift register which could be utilized is whown in FIG. 2. The recursive shift register shown in FIG. 2 may have different numbers of unique states depending on the binary number that is initially loaded into it. For example, if one of the binary numbers shown in Table 2 are used to initialize the register, it will have 21 unique states.

TABLE 2

| sequence number | register contents | sequence number | register contents |
|---|---|---|---|
| 1 | 00001 | 2 | 00011 |
| 3 | 00111 | 4 | 01111 |
| 5 | 11111 | 6 | 11110 |
| 7 | 11101 | 8 | 11010 |
| 9 | 10101 | 10 | 01010 |
| 11 | 10100 | 12 | 01001 |
| 13 | 10011 | 14 | 00110 |
| 15 | 01100 | 16 | 11000 |
| 17 | 10001 | 18 | 00010 |
| 19 | 00100 | 20 | 01000 |
| 21 | 10000 | | |

It will have three unique states if one of the binary numbers shown in Table 3 are used to initialize the register.

TABLE 3

| sequence number | register contents | sequence number | register contents | sequence number | register contents |
|---|---|---|---|---|---|
| 1 | 10110 | 2 | 01101 | 3 | 11011 |

And, it will have seven unique states if one of the binary numbers shown in Table 4 are used to initialize the register.

TABLE 4

| sequence number | register contents | sequence number | register contents | sequence number | register contents |
|---|---|---|---|---|---|
| 1 | 11001 | 2 | 10010 | 3 | 00101 |
| 4 | 01011 | 5 | 10111 | 6 | 01110 |
| 7 | 11100 | | | | |

The recursive shift register of FIG. 2 would be useful if it is desired to have program sequences of 21, 3 or 4 steps which could be repeated many times.

Figure 3:
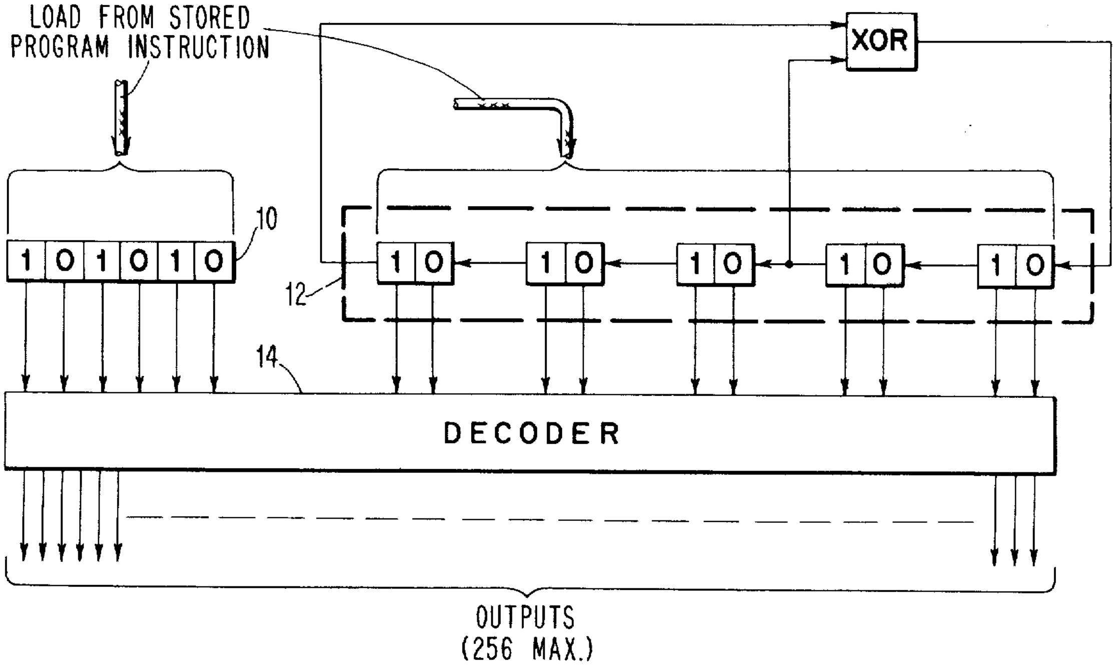
FIG. 3 is a schematic representation of the combination of a recursive shift register and an instruction decoder.

Further expansion of the principles discussed above could be accomplished by an additional standard binary register used in conjunction with the recursive shift register. Referring to FIG. 3, there is shown a 3-bit register in conjunction with a 5-bit recursive shift register. The 3-bit register 10 will have 8 unique binary states and the 5-bit recursive shift register 12 has 32 possible binary states (including the 00000 state). In combination, this structure permits 256 different operation codes which can be initialized by the data processor.

The stored program instruction which is used to invoke the shift register program will have eight data bits, three of which are loaded into the 3 bit register 10 and 5 of which are loaded into the 5-bit shift register 12. Since there are 256 possible binary states a great variety of routines and subroutines can be realized by this structure and many branches to different routines or loops within loops can be accomplished.

The output lines from the combination of the 3-bit register 10 and the recursive shift register 12 are connected to decoder 14 which decodes the 8-bit binary number into one of the 256 possible output conditions. The output lines of the decoder 14 are then introduced into the data processor control logic for controlling the operation of the computer. In addition to the capability of assigning a computer instruction to each unique binary code, it is also possible to have the same instruction appear in several different program sequences. If this is desired, the output lines from the decoder 14 which specify the same function to be executed by the computer, are ORed together within the control logic of the general purpose computer.

Figure 4:
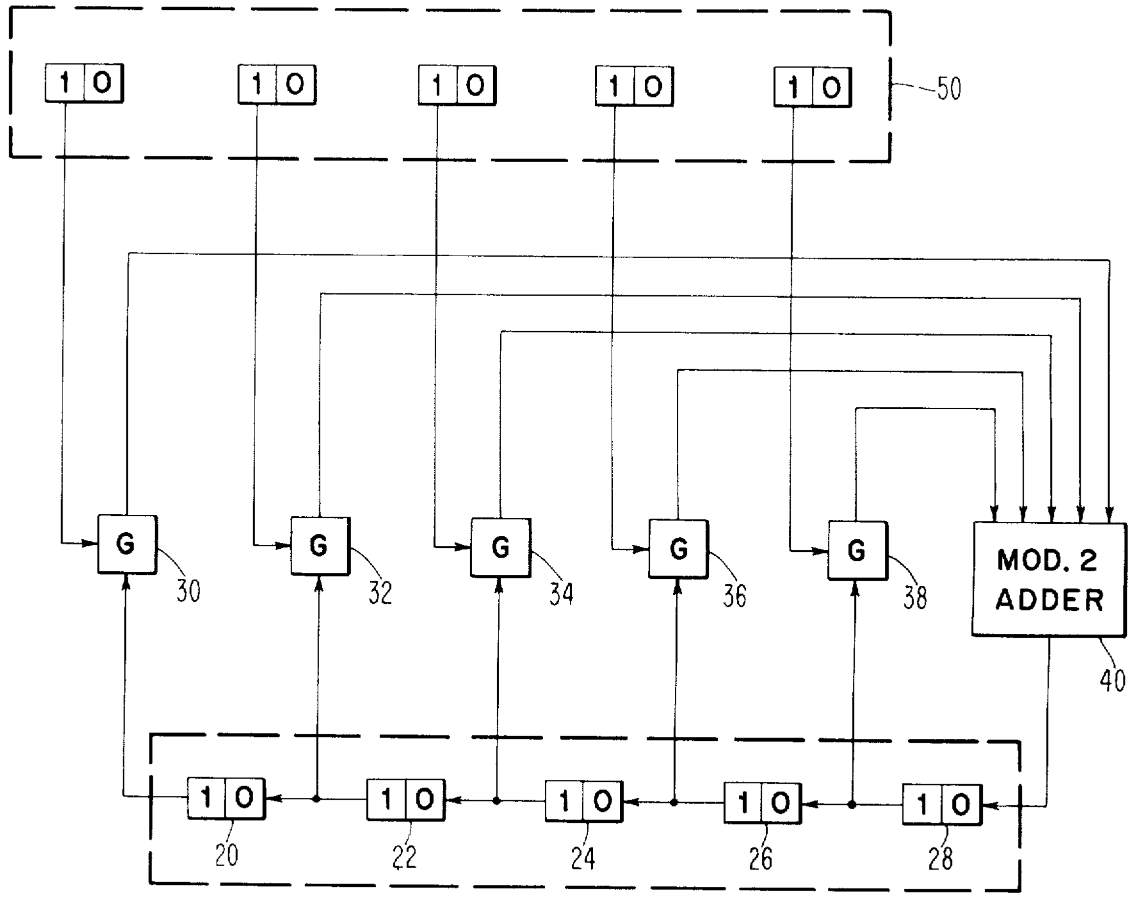
FIG. 4 is a schematic representation of a variable recursive shift register operating under the direction of a control register.

Referring now to FIG. 4, there is shown a 5-bit recursive shift register with variable feedback connections. Each of the stages in the shift register 20, 22, 24, 26, and 28 can be selectively connected by means of gates 30, 32, 34, 36 and 38 to modulo-2 adder 40 to complete the feedback path that is desired. Each of the gates 30 through 38 are opened and closed under the control of the control register 50.

Assuming that a binary control word of -10010- were stored in the control register 50, the recursive shift register comprising stages 20 through 28 would be made equivalent to the recursive shift register shown in FIG. 1. If the control word were -10001-, the shift register in FIG. 4 would be equivalent to that shown in FIG. 2. For the purpose of simplicity, all of the possible control words that are capable of being loaded into the control register 50 will not be described herein. However, it should be recognized that it is possible to effect a branch from one program sequence to another program sequence by loading a new control word into the control register 50. For example, if a control word of -11111- were used, four loops of six instructions, two loops of three instructions and two loops of one instruction are possible; these are shown in Table 5.

In order to facilitate understanding of the invention, the following description will cover the operation of the register shown in FIG. 4 under three different control words.

TABLE 5

| sequence number | register contents | register contents | register contents | register contents |
|---|---|---|---|---|
| 1 | 00001 | 00010 | 00111 | 01011 |
| 2 | 00011 | 00101 | 01111 | 10111 |
| 3 | 00110 | 01010 | 11110 | 01110 |
| 4 | 01100 | 10100 | 11100 | 11101 |
| 5 | 11000 | 01000 | 11001 | 11010 |
| 6 | 10000 | 10001 | 10011 | 10101 |
| 1 | 00100 | 01101 | | |
| 2 | 01001 | 11011 | | |
| 3 | 10010 | 10110 | | |
| 1 | 00000 | 11111 | | |

CONTROL WORD 00011

The use of this control word permits only one loop of three instructions but this loop can be entered at any one of the three instructions depending on the starting state of the shift register 20. There are 9 starting states that yield the loop as shown in Table 6.

TABLE 6

| sequence number | | register contents | sequence number | | register contents | sequence number | | register contents |
|---|---|---|---|---|---|---|---|---|
| 1 | | 00001 | 1 | | 00010 | 1 | | 11111 |
| 2 | | 00011 | 2 | | 00101 | 2 | | 11110 |
| 3 | | 00110 | 3 | | 01011 | 3 | | 11101 |
| 4 | A | 01101 | 4 | C | 10110 | 4 | B | 11011 |
| 5 | B | 11011 | 5 | A | 01101 | 5 | C | 10110 |
| 6 | C | 10110 | 6 | B | 11011 | 6 | A | 01101 |

An additional feature of the shift register arrangement operating under this control word is that if a starting state that does not include two right hand "ones" is used, the register will progress to 00000 and stay there. An exemplary reference is: 11100, 11000, 10000, 00000. Thus, putting in the control word -00011- and specifying a starting state such as shown on the lower portion of Table 6 provides three different "headers" of up to three instructions followed by the loop A,B,C; C,A,B; or B,C,A.

CONTROL WORD 01100

The use of this control word yields a loop of 15 steps. There are 15 starting states which lead directly to the same loop but at different entry points as shown in Table 7. Note that a starting state of 10000 would level to 00000 which would repeat infinitum.

TABLE 7

| | Loop | Starting States |
|---|---|---|
| | | 00001 |
| A | 00010 | 10010 |
| B | 00100 | 10100 |
| C | 01001 | 11001 |
| D | 10011 | 00011 |
| E | 00110 | 10110 |
| F | 01101 | 11101 |
| G | 11010 | 01010 |
| H | 10101 | 00101 |
| I | 01011 | 11011 |
| J | 10111 | 00111 |
| K | 01111 | 11111 |
| L | 11110 | 01110 |
| M | 11100 | 01100 |
| N | 11000 | 01000 |
| O | 10001 | |

CONTROL WORD 10101

The use of this control word yields two loops of 15 steps as shown in Table 8.

TABLE 8

| | LOOP I | | LOOP II |
|---|---|---|---|
| A | 01011 | A' | 01010 |
| B | 10111 | B' | 10100 |
| C | 01111 | C' | 01000 |
| D | 11110 | D' | 10000 |
| E | 11100 | E' | 00001 |
| F | 11000 | F' | 00011 |
| G | 10001 | G' | 00111 |
| H | 00010 | H' | 01110 |
| I | 00100 | I' | 11101 |
| J | 01001 | J' | 11011 |
| K | 10011 | K' | 10110 |
| L | 00110 | L' | 01100 |
| M | 01101 | M' | 11001 |
| N | 11010 | N' | 10010 |
| O | 10101 | O' | 00101 |

CONTROL OF SEQUENCING OF SHIFT REGISTER

There are a number of distinct methods by which the sequencing of the shift register 50 or processing flow of the subroutines can be controlled:

1. The feedback function for the shift register can be changed by use of a control word in the control register 50 of FIG. 4.

2. Control bits may be employed to allow for differentiations of subroutines that employ the same shift register patterns. The shift register configurations are re-interrupted as different instructions according to the control bit setttings, thereby allowing a large variety of different subroutines to be implemented with the same shift register cycles.

3. The contents of registers or memory locations may be used as a basis for changing the contents of the recursive shift register thereby altering the normal sequence. However, the contents of the shift register, may also be changed independently of the state of any other register or memory location corresponding to an unconditional branch in a stored program.

4. The shift register can be preset to various patterns prior to entering the recursive shift register control mode, thereby enabling different set of operations to be performed.

5. The state of the recursive shift register can signals the termination of the subroutine — for example, 00000 (in a 5-bit shift register) can indicate completion of the routine. Other defined bit configurations can be used to invoke other subroutines (by causing change of the codeword in the control register and/or changing the shift register pattern).

It should be noted that a multiple set of recursive shift registers can be employed with a hierarchical control of one by another. Namely, the state of one can be used to activate or inhibit the workings (shifting) of the others.

EXEMPLARY EMBODIMENT

Figure 5:
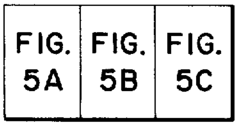
FIG. 5 is a diagram showing the connection between FIGS. 5A, 5B and 5C.
Figure 5A:
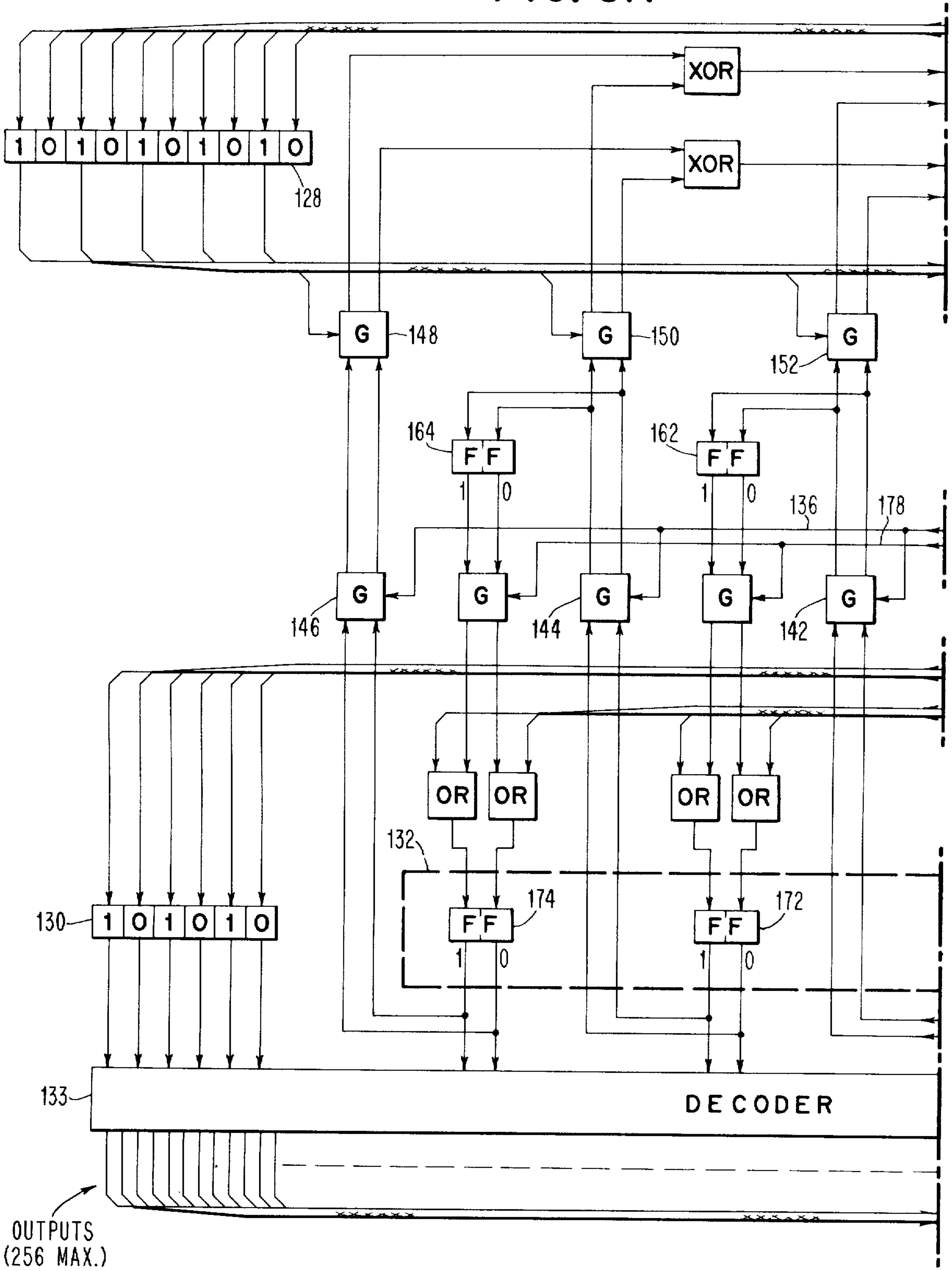
FIGS. 5A, 5B and 5C are a schematic representation of a system which utilizes a recursive shift register for generating computer instructions.
Figure 5B:
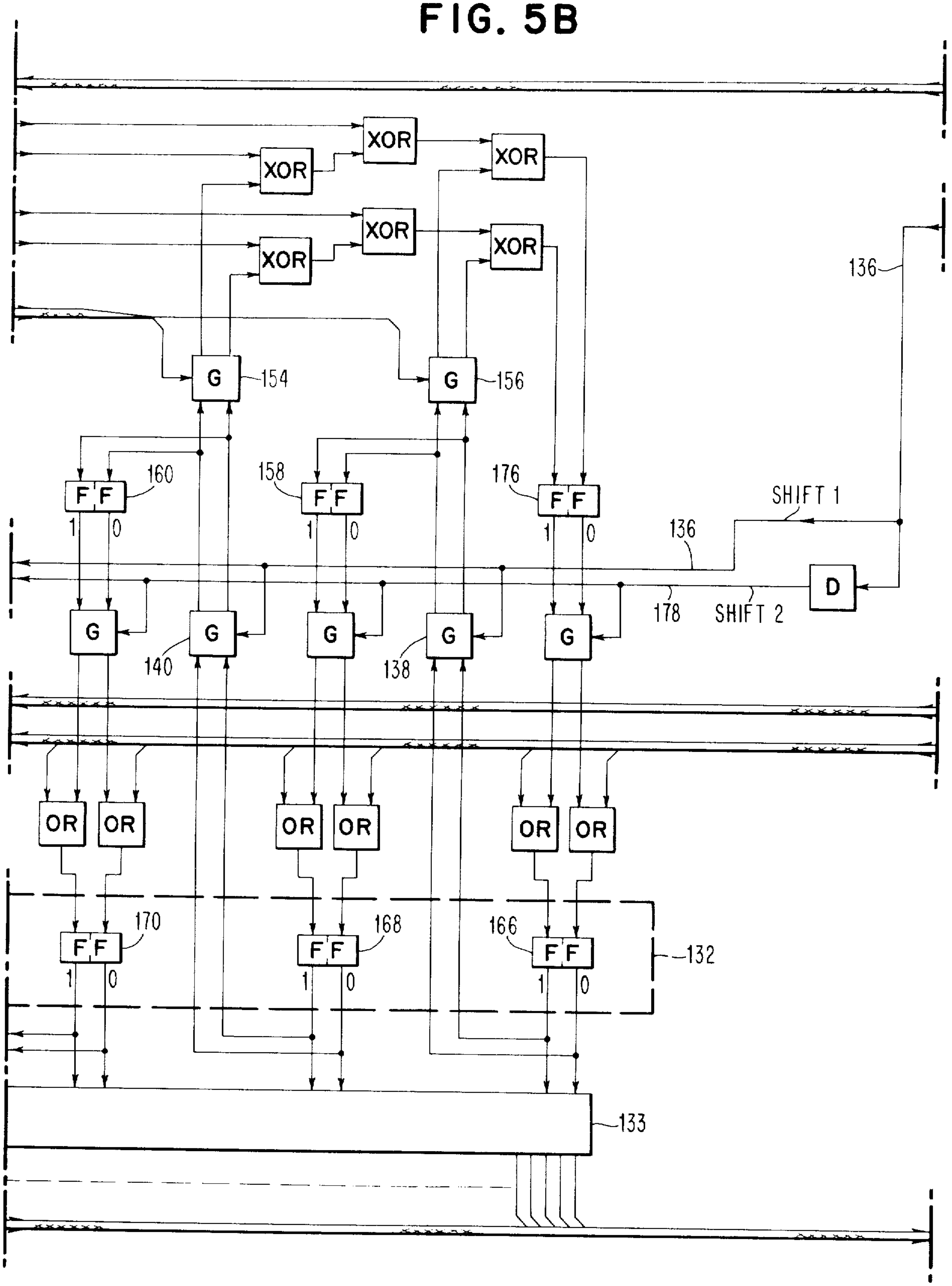
Figure 5C:
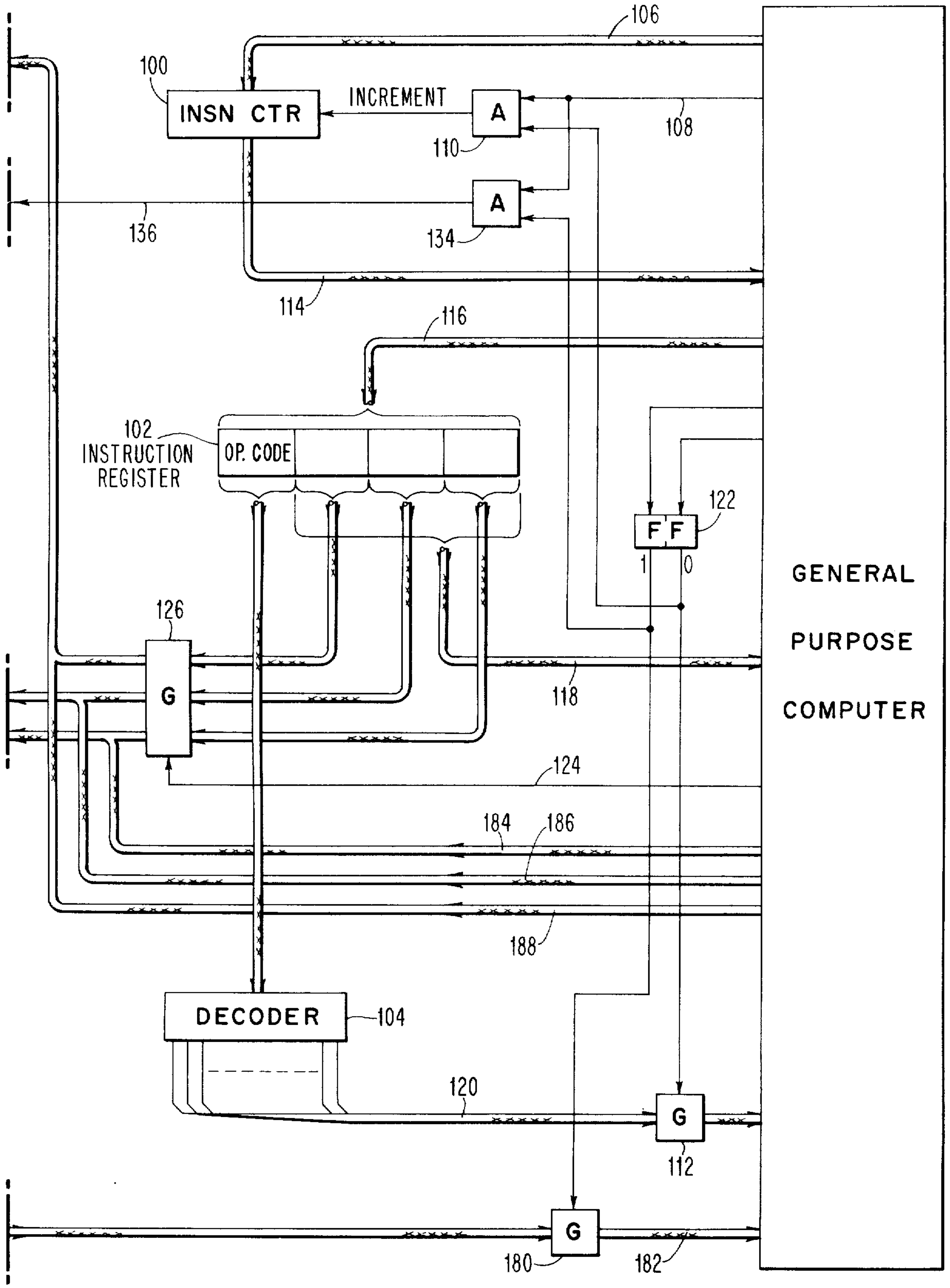

Referring now to FIGS. 5A, 5B and 5C there is shown a system which utilizes the inventive principles described herein. As in a conventional general purpose data processor, the exemplary embodiment contains an instruction counter 100, an instruction register 102 and a decoder 104. In the execution of a stored program the general purpose computer identifies the next computer instruction by the contents in the instruction counter 100. The binary pattern representing the specific instruction identified in the instruction counter 100 is fetched and loaded into the instruction register 102. The instruction contained in the instruction register 102 generally consists of an operation code (OP) which identifies a specific function to be carried out by the computer and operand fields which contain addresses or data that is to be operated on by the function carried out in accordance with the OP code. The OP code contained in the instruction register 102 is output to the decoder 104 for the purpose of decoding the binary pattern into one or more signal pulses presented on line 120 which are introduced to the logic control of the general purpose computer.

Addresses of computer instructions for a stored program are generally kept in the memory of the general purpose computer and are loaded into the instruction counter 100 and are loaded by means of cable 106. The instruction counter 100 is incremented by a pulse appearing on line 108. When the computer is operating under the control of a stored program, flip-flop 122 is in its 0 state thus enabling AND circuit 110 and GATE 112. Addresses of computer instructions are provided to the general purpose computer by means of cable 114. Computer instructions, when obtained from memory, are loaded into the instruction register 102 by means of a cable 116. The data portion or operand fields of the computer instructions are supplied to the general purpose computer by means of cable 118. The OP code portion of the computer instruction is applied to the decoder 104 and the output lines of the decoder 104 are connected to the general purpose computer by means of cable 120 and GATE 112.

At this point, it is assumed that the instruction register 102 contains a machine instruction that calls for a routine or program sequence which is be carried out by the recursive shift register structure shown on FIG. 5C. The general purpose computer, in executing this instruction will set flip-flop 122 to its 1 state and provide a pulse on line 124 which enables GATE 126 in order to load register 128, 130 and 132. During the latter part of the execution cycle of a computer instruction a pulse will appear on line 108 which is normally used to increment the instruction counter. Because flip-flop 122 is now in its 1 state, AND circuit 134 will be enabled and the pulse will appear on line 136 to provide shift pulses for the register 132. The number which is used to load register 132 must be a number which will cause the shift register 132 to advance to the starting state of the desired instruction sequence after it is shifted once. The actual shifting will next be described.

The SHIFT 1 pulse on line 136 is applied to GATES 138, 140, 142, 144 and 146. Two or more of GATES 148 through 156 inclusive are enabled, according to the value of the control word loaded into register 128. Than, the contents of flip-flop 166 are transferred to flip-flop 158, the contents of flip-flop 168 are transferred to flip-flop 160, the contents of flip-flop 170 are transferred to flip-flop 162, the contents of flip-flop 172 are transferred to flip-flop 164, and the modulo-2 sum of selected flip-flops 166 through 174 inclusive are formed by the EXCLUSIVE-OR circuits at the top of FIG. 5C and loaded into flip-flop 176. When the SHIFT 1 pulse has disappeared on wire 136, a SHIFT 2 pulse appears on wire 178. Then, flip-flop 176 is gated to flip-flop 166, flip-flop 158 is gated to flip-flop 168, flip-flop 160 is gated to flip-flop 170, flip-flop 162 is gated to flip-flop 172 and flip-flop 164 will be gated to flip-flop 174. In this manner, the recursive shift is accomplished.

At the conclusion of the shift cycle, the contents of register 132 are provided to the decoder 133 which decodes the 8-bit binary number into the 256 output lines which are fed through gate 180 along cable 182. The general purpose computer will now receive its instructions from cable 182 instead of cable 120. The execution of some of these instructions may involve placing data on any one, any two or all three of cables 184, 186 or 188 in order to reload registers 128, 130 or 132. The execution of some of these instructions would also result in the resetting of flip-flop 122 to its 0 state which would return the computer to its stored program type of operation.

Exemplary Programs

The following description illustrates two program sequences which are implemented by the recursive shift register embodiment shown in FIGS. 5A, 5B and 5C. The first program illustrates a sequence for carrying out a square root process and the second example illustrates a program sequence for evaluating a polynomial.

For the purpose of this discussion, it is assumed that the general purpose computer contains five general purpose registers which can be used by the program. Furthermore, the recursive shift register 132 is hereby identified by the designation S. The five registers are as follows: Register A is an accumulator register in which there is also stored the results of multiplications or division operations; Registers X, Y and Z are storage registers; and Register B is an index register. In addition to the registers identified above, it is assumed that there is a set of *n* memory locations available for accessing information to be placed in the Registers A, X, Y and Z.

In the first example, a 5-bit recursive shift register is used with an arrangement that provides at least fourteen states plus a quiescent state consisting of all zeros. In the second example, there is only required a five unique states and a 5-bit recursive shift register is employed having a linear feedback and initial shift register setting that enables the utilization of the three length cycle discussed previously.

The computer instructions shown in Table 9 are now defined. The contents of a memory location or register is designated by (*l*) and *l* can take on values of A, X, Y, Z, B, and S.

SQUARE ROOT COMPUTATION

In this illustration the program sequence computes the square root of a number by means of the well known Newton-Raphson iterative technique as follows:

find: $x = \sqrt{R}$, where $O \leq x, R \leq 1$
by means of the formula $$\begin{cases} x_0 = \tfrac{1}{2}R + \tfrac{1}{2} \\ x_{n+1} = \tfrac{1}{2}(R/x_n = x_n) \end{cases}$$

Stop upon $|X_{n+1} - X_n| < \epsilon$
Note that $X_0 \geq X_1 \geq X_2 \geq \ldots \geq X_{n+1}$ In order to carry out 14 computer instructions as required by the desired program sequence control register 128 is set to a value which effects an interconnection of the recursive shift register 132 that is the same as shown in FIG. 2. As discussed previously, this arrangement provides for 21 different states of the recursive shift register. Since only 14 states are required for the recursive shift register, the sequence as shown in TABLE 4 will not make use of the sequence steps 15 through 21 and a state of all zeros in the recursive shift register is used as the indicator of termination of the program sequence. The program sequence to carry out the square root computation is shown in Table 10.

TABLE 10

| Instruction Number | Contents of Register S | Instruction | | Comments |
|---|---|---|---|---|
| 1. | 00001 | STORE A | Z | $Z \leftarrow R$ |
| 2. | 00011 | MULT | .5 | A .5R The literal .5 can be in another shift register or in a memory location. |
| 3. | 00111 | ADD | .5 | $A \leftarrow .5R + .5\ (A) = X_0$ |
| 4. | 01111 | STORE A | X | $X \leftarrow X_0 = X_n$ |
| 5. | 11111 | LOAD A | Z | $A \leftarrow R$ |
| 6. | 11110 | DIV | X | $A \leftarrow R/X_n$ |
| 7. | 11101 | ADD | X | $A \leftarrow R/X_n + X_n$ |
| 8. | 11010 | MULT | .5 | $A \leftarrow 1/2\ (R/X_n + X_n) = X_{n+1}$ |
| 9. | 10101 | STORE A | Y | $Y \leftarrow X_{n+1}$ |
| 10. | 01010 | SUB | X | $A \leftarrow X_{n+1} - X_n$ |
| 11. | 10100 | ADD.000.. | .05 | Form $\lvert X_{n+1} - X_n \rvert - \epsilon$ |
| 12. | 01001 | TEST A | | If $\lvert X_{n+1} - X_n \rvert < \epsilon$, then load S with 00000. Otherwise S advances to next state |
| 13. | 10011 | LOAD A | Y | $A \leftarrow X_{n+1}$ |
| 14. | 00110 | LOAD S | 01111 | Branch to step No. 4 to iterate by loading S with 01111 |
| 15. | 01100 | ERROR | | |
| | 00000 | SIGNAL | | QUIESCENT STATE indicating end of program sequence $X = \sqrt{R}$ is in Y register |

TABLE 9

| Instruction | Definition |
|---|---|
| LOAD l $m_i$ | Load the contents of the storage address $m_i$ into register l |
| STORE l $m_i$ | Store the contents in register l into storage at address $m_i$ |
| MULT $m_i$ | Multiply the contents of A with the contents of $m_i$ and store the result in A. Note that $m_i$ can be a register, a memory address, or a literal, e.g., .5. |
| ADD $m_i$ | Add the contents of A with the contents of $m_i$ and store the sum in A. |
| DIV $m_i$ | Divide the contents of A by the contents of $m_i$ and store the result in A. |
| SUB $m_i$ | Subtract the contents of $m_i$ from the contents of A and store the results in A. |
| TEST M | If (M) <O then register S is set to 0; Otherwise continue in sequence. Note M can be A, X, Y, Z or B. |
| SIGNAL | SIGNAL the computer that program sequence is completed. |
| ERROR | Send error signal indicating malfunction to the computer. |
| ADD $m_i$, B | Add the contents of B to the address value $m_i$ then add the contents of that resulting memory location to the contents of A and store the sum in A. The contents of register B is decremented by 1 after the execution of the addition portion of the instruction. |

Polynomial Evaluation

In this illustration a polynomial of degree n is evaluated. The coefficients of the polynomial are stored contiguously in a section of main memory starting at memory location m. Many functions can be approximated by expressing them in terms of their Taylor expansion or with Chebyshev polynomials, as discussed in *Approximations for Digital Computers*, C. Hastings, Princeton University Press, copyright 1955.

The polynomial is evaluated in nested form, i.e., $$\sum_{k=0}^{n} a_k X^k = a_0 + a_1 x + a_2 x^2 + \ldots + a_n X^n$$

$$= a_0 + x(a_1 + X(a_2 + X(\ldots X(a_{n-1} + X(a_n))\ldots)$$

It is assumed that the program sequence is begun with the value *x* in the X register and the value *n* in the B register. The value of the polynomial is returned in register A. The shift register S is taken to be 5 bits with a control word of -00011-.

| Instruction Number | Contents of Register S | Instruction | Comments |
|---|---|---|---|
| 1. | 00110 | LOAD A 0 | Clear the A register, A ← O |
| →2. | 01101 | ADD m,B | A ← (A) + $a_k$ where k = n, n−1, n−2, ...0. |
| 3. | 11011 | TEST B | If (B) < 0 then S ← 00000; otherwise continue to step No. 4. |
| 4. | 10110 | MULT X | A ← X · (A) |
| → | 00000 | SIGNAL | QUIESCENT STATE |

The program sequence is entered by inserting the pattern 00110 into the shift register S. This is a load instruction which clears the A register. This is followed by a three instruction cycle. Instruction 2 specifies that the coefficient $a_k$, is supplied by the particular value of the B register, is added to the contents of the A register. In addition, it decrements the B register after the addition is performed. Instruction 3 tests the contents of the B register for a negative value. If non-negative, the shift register sequences to the multiplication instruction 4. If B is negative the three instruction cycle is broken by a 00000 being entered into S, thereby terminating the polynomial evaluation routing.

Subsequent to instruction 4, the binary pattern in S returns to the value 01101 thereby reactivating the ADD *m*,B instruction which causes the addition of a new $a_k$ term to the partial evaluation of the polynomial.

While the invention has been described herein with regard to an exemplary embodiment having two modes of operation, it should be recognized by those skilled in the art, that the principles presented herein are not limited to such an application. For example, it is possible to construct a special purpose computer which operates solely under the control of a recursive shift register built in accordance with the principles of the invention as set forth herein. Furthermore, while the invention has been described in terms of a relatively small recursive shift register, there is no limitation in terms of the size of the register.

Again, for expositional clarity, the decoding net for the recursive register mode of operation has been shown as being separate from the decoding net of the prior shift register mode. A complete decoding net could be implemented which would include the mode indicator bit.

For the purpose of simplicity, the invention has been described in terms of linear recursive shift registers. However, it is contemplated that the principles of the invention can be applied to the use to non-linear shift registers as well.

It should be recognized that while the invention has been described in terms of a single recursive shift register for controlling the operation of the data processor, other arrangements could be implemented. Particularly, it is possible to provide a hierarchy of recursive shift registers within the system which could be activated by each other. Furthermore, it is also possible to implement a plurality of recursive shift registers operating simultaneously within the system.

What is claimed is:

1. A digital data processor for executing a sequence of computer instructions comprising:

storage means for maintaining digital information that can be accessed by said data processor;

a recursive shift register means for providing as output a recursive digital word, which word is directly decodable as a machine executable instruction;

means for incrementing said recursive shift register to produce a sequence of such recursive digital words;

decoder means connected to said recursive shift register for decoding the digital word currently stored therein and providing signals to said data processor for controlling the execution of operations within said data processor.

2. The system as defined in claim 1 further comprising control means for controlling the recursive sequence of said recursive shift register, said control means including:

feedback means for effecting a particular feedback circuit configuration within said recursive shift register means.

3. The system as defined in claim 2 wherein said feedback means comprises a plurality of logic devices;

control means for selecting a specific arrangement of said logic devices.

4. The system as defined in claim 3 wherein said logic devices are modulo-2 adders and said digital information consists of binary data.

5. The system as defined in claim 3 wherein said control means further comprises:

register means for containing a prespecified code word;

code word supply means for selectively loading said register means so as to effect a particular feedback configuration of said recursive shift register.

6. The system as defined in claim 1 further comprising initialization means for loading a predetermined pattern in said recursive shift register prior to activation of said recursive shift register.

7. The system as defined in claim 1 further comprising means for loading a predetermined pattern in said recursive shift register for effecting a particular sequence to be carried out by said recursive shift register.

8. A digital data processor for executing a sequence of computer instructions comprising:

storage means for maintaining digital information that can be accessed by said data processor;

said digital information representing computer instructions to be executed as part of a sequence that forms a computer program;

recursive shift register means for providing as output a recursive digital word;

decoder means connected to said recursive shift register for decoding said digital word and providing signals to said data processor for controlling the execution of said data processor;

control means responsive to the decoding of a specific computer instruction for discontinuing execution of said computer program and beginning the operation of said recursive shift register means;

termination means for decoding a digital word indicating the termination of the sequence carried out by said recursive shift register means and returning said data processor to the execution of said computer program.

* * * * *